US012128005B2

(12) United States Patent
Okabayashi et al.

(10) Patent No.: US 12,128,005 B2
(45) Date of Patent: Oct. 29, 2024

(54) PACKAGING BODY, TABLET-CONTAINING PACKAGING BODY, METHOD FOR MANUFACTURING ACCOMMODATION MEMBER OF PACKAGING BODY, AND APPARATUS FOR MANUFACTURING ACCOMMODATION MEMBER OF PACKAGING BODY

(71) Applicant: Daicel Corporation, Osaka (JP)

(72) Inventors: Tomohito Okabayashi, Tokyo (JP); Takahiro Hiramura, Tokyo (JP); Naohiro Hashikawa, Tokyo (JP)

(73) Assignee: DAICEL CORPORATION, Osaka (JP)

(*) Notice: Subject to any disclaimer, the term of this patent is extended or adjusted under 35 U.S.C. 154(b) by 778 days.

(21) Appl. No.: 17/250,639

(22) PCT Filed: Aug. 7, 2019

(86) PCT No.: PCT/JP2019/031048
§ 371 (c)(1),
(2) Date: Feb. 15, 2021

(87) PCT Pub. No.: WO2020/036105
PCT Pub. Date: Feb. 20, 2020

(65) Prior Publication Data

US 2021/0220220 A1 Jul. 22, 2021

(30) Foreign Application Priority Data

Aug. 17, 2018 (JP) ................................ 2018-153416

(51) Int. Cl.
*A61J 1/03* (2023.01)
*B65B 3/00* (2006.01)
(Continued)

(52) U.S. Cl.
CPC ............... *A61J 1/035* (2013.01); *B65B 3/003* (2013.01); *B65B 3/022* (2013.01); *B65B 11/52* (2013.01)

(58) Field of Classification Search
CPC .......... A61J 1/035; B65B 3/003; B65B 3/022; B65B 11/52
(Continued)

(56) References Cited

U.S. PATENT DOCUMENTS 4,292,299 A * 9/1981 Suzuki .................. A61K 9/209 424/435
4,376,111 A 3/1983 Tovey
(Continued)

FOREIGN PATENT DOCUMENTS

DE 102008016033 A1 * 10/2009 ............. A61J 1/035
JP 10-017683 11/1935
(Continued)

OTHER PUBLICATIONS

International Search Report of Internal Application No. PCT/JP2019/031048 mailed Oct. 21, 2019.
(Continued)

*Primary Examiner* — Bryon P Gehman
(74) *Attorney, Agent, or Firm* — Morgan, Lewis & Bockius LLP

(57) ABSTRACT

A packaging body 141 for containing a thin tablet 100, including an accommodation member 142, wherein the accommodation member 142 includes an inlet 147 and an accommodation portion 146 recessed from the inlet 147, and the accommodation member 142 has a structure in which at least a portion of the thin tablet 100 accommodated in the accommodation portion 146 moves toward the inlet 147 upon application of a force, by an object inserted from the
(Continued)

inlet 147, to a portion of the thin tablet 100 accommodated in the accommodation portion 146.

6 Claims, 16 Drawing Sheets

(51) Int. Cl.
*B65B 3/02* (2006.01)
*B65B 11/52* (2006.01)

(58) Field of Classification Search
USPC .......................................... 206/530, 531, 804
See application file for complete search history.

(56) References Cited

U.S. PATENT DOCUMENTS

| | | | | | |
|---|---|---|---|---|---|
| 4,493,822 | A | | 1/1985 | Tovey | |
| 5,673,793 | A | * | 10/1997 | Seidler | B65D 75/58 206/532 |
| 5,711,416 | A | | 1/1998 | Bauman | |
| 5,800,832 | A | * | 9/1998 | Tapolsky | A61K 47/38 424/448 |
| 5,816,404 | A | * | 10/1998 | Seidler | B65D 75/327 206/532 |
| 6,783,768 | B1 | * | 8/2004 | Brown | A61K 9/2893 427/474 |
| 7,434,691 | B2 | * | 10/2008 | Negron | A61B 1/00057 206/530 |
| 7,828,147 | B2 | * | 11/2010 | Caracciolo | A61J 7/0084 206/530 |
| 8,833,548 | B2 | * | 9/2014 | Hsieh | A45C 11/046 206/804 |
| 10,369,076 | B2 | * | 8/2019 | Milante | A61J 1/035 |
| 2009/0283437 | A1 | | 11/2009 | Angelucci et al. | |
| 2016/0244914 | A1 | | 8/2016 | Geerdinck et al. | |
| 2017/0135367 | A1 | | 5/2017 | Aydin | |
| 2018/0235889 | A1 | | 8/2018 | Okabayashi et al. | |
| 2018/0243221 | A1 | | 8/2018 | Hamasaki et al. | |

FOREIGN PATENT DOCUMENTS

| | | | |
|---|---|---|---|
| JP | 57-501847 | | 10/1982 |
| JP | 2009-262935 | A | 11/2009 |
| JP | 2012-144288 | A | 8/2012 |
| JP | 2017-524378 | A | 8/2017 |
| JP | 2018-122913 | A | 8/2018 |
| WO | 82/01818 | A1 | 6/1982 |
| WO | 2016/204291 | | 12/2016 |
| WO | 2017/002803 | | 1/2017 |
| WO | 2017/038455 | | 3/2017 |

OTHER PUBLICATIONS

Extended European Search Report issued in counterpart European Patent Application No. 19849154.0 dated Apr. 4, 2022.
Office Action issued in counterpart Japanese Patent Application No. 2018-153416 dated Apr. 19, 2022.
Office Action issued in counterpart Chinese Patent Application No. 201980053690.8 dated May 11, 2022.
Office Action issued in the corresponding KR Application No. 10-2021-7007757, issued Jul. 1, 2024.

* cited by examiner

PACKAGING BODY, TABLET-CONTAINING PACKAGING BODY, METHOD FOR MANUFACTURING ACCOMMODATION MEMBER OF PACKAGING BODY, AND APPARATUS FOR MANUFACTURING ACCOMMODATION MEMBER OF PACKAGING BODY

This application is a national stage application of International Patent Application No. PCT/JP2019/030148, filed Aug. 7, 2019, which claims priority to Japanese Patent Application No. 2018-153416, filed Aug. 17, 2018. The entirety of the aforementioned applications is incorporated herein by reference.

FIELD

The present invention relates to a packaging body, a tablet-containing packaging body, a method for manufacturing an accommodation member of a packaging body, and an apparatus for manufacturing an accommodation member of a packaging body.

BACKGROUND

To date, orally disintegrating tablets (as disclosed, for example, in Patent Document 1) and easy-to-take solid formulations (as disclosed, for example, in Patent Document 2) have been developed as highly convenient dosage forms that can be safely taken by elderly people, children, patients who have difficulty swallowing medication, and the like, and that can be easily taken without water. For example, in a case where a particular patient is unable to recognize the need of taking medicine and expectorates a tablet, a tablet that disintegrates within the oral cavity, for example, within 10 seconds (a very rapidly disintegrating tablet), as disclosed in Patent Document 1, is necessary.

The very rapidly disintegrating tablets are formed, for example, as thin tablets. Examples of thin tablets include truly flat tablets having a thin cylindrical shape with a diameter of approximately 14 mm or greater and a thickness of 0.5 mm or greater and 1.5 mm or less. Although the thin tablets are used, for example, as very rapidly disintegrating tablets, some of them are used in other applications.

Known thick tablets are provided, for example, in containers called blister packs. A blister pack is formed, for example, by combining a plastic accommodation sheet and an aluminum cover. In the accommodation sheet, an accommodation portion is formed as a columnar deep recess fitted to the tablet. An inlet of the accommodation portion is covered with a cover in a state in which the tablet is placed in the accommodation portion. The cover is in close contact with the accommodation sheet around the accommodation portion. When the tablet is taken out, the tablet is pushed toward the cover from the outside of the accommodation portion, for example, to tear the cover with the tablet.

In one example, the inlet of the accommodation portion is covered with a cover that slides parallel with an opening of the accommodation portion.

CITATION LIST

Patent Document

Patent Document 1: WO 2017/038455 A1
Patent Document 2: WO 2017/002803 A1

SUMMARY

Technical Problem

In the case of a known thick tablet, it is easy to push the tablet to tear the cover. However, in the case of a thin tablet, a thin tablet that has undergone a strong force toward the cover breaks. In addition, there is a problem that, when the accommodation portion is tilted to take out the thin tablet, the thin tablet can be easily dropped. In addition, fingers need to be inserted into the accommodation portion to pinch the thin tablet across a long width, and thus there is a problem that the thin tablet is likely to be broken.

An object of the present invention is to provide a packaging body that is not liable to damage a thin tablet in comparison with the related art, a tablet-containing packaging body that is not liable to damage a thin tablet, a method for manufacturing an accommodation member of a packaging body that is not liable to damage a thin tablet, and an apparatus for manufacturing an accommodation member of a packaging body that is not liable to damage a thin tablet.

Solution to Problem

More specifically, the present invention provides the following aspects.

First Aspect

A packaging body for containing a thin tablet, the packaging body including an accommodation member,

- wherein the accommodation member includes:
  - an inlet; and
  - an accommodation portion recessed from the inlet, and
- the accommodation member has a structure in which at least a portion of the thin tablet accommodated in the accommodation portion moves toward the inlet upon application of a force, by an object inserted from the inlet, to a portion of the thin tablet accommodated in the accommodation portion.

Second Aspect

The packaging body according to the first aspect, wherein the structure, in which the at least a portion of the thin tablet accommodated in the accommodation portion moves toward the inlet upon application of the force, includes a structure in which an other portion of the thin tablet accommodated in the accommodation portion protrudes from the inlet upon application of the force.

Third Aspect

The packaging body according to the first or second aspect,

- wherein the inlet extends parallel to an imaginary plane,
- the accommodation portion includes a sliding surface for sliding the thin tablet within the accommodation portion,
- the sliding surface does not overlap with any other portion of the accommodation portion in a direction orthogonal to the imaginary plane, and
- the sliding surface is inclined with respect to the imaginary plane.

Fourth Aspect

The packaging body according to the third aspect, wherein an inclination angle of the sliding surface with respect to the imaginary plane is not less than 0 degrees and not greater than 70 degrees, and the inclination angle of the sliding surface in a region closest to the inlet is greater than 0 degrees.

Fifth Aspect

The packaging body according to the fourth aspect, wherein the inclination angle of the sliding surface with respect to the imaginary plane decreases as a distance from the inlet increases.

Sixth Aspect

The packaging body according to any one of the first to fifth aspects, further including a cover that at least partially covers the inlet.

Seventh Aspect

The packaging body according to the sixth aspect, wherein the accommodation member includes a margin extending from the inlet outside the accommodation portion, and the packaging body includes an adhesive layer that releasably adheres the cover to the margin.

Eighth Aspect

A tablet-containing packaging body including:

the packaging body described in any one of the first to seventh aspects; and the thin tablet accommodated in the accommodation portion of the packaging body.

Ninth Aspect

A tablet-containing packaging body including:

the packaging body described in the sixth or seventh aspect; and the thin tablet accommodated in the accommodation portion of the packaging body, wherein the thin tablet includes:

a body including two surfaces that are planes; and a protrusion provided on at least one of the surfaces, the two surfaces include a first surface and a second surface, the protrusion is provided on the first surface, and when the thin tablet is positioned in the accommodation portion with an outer edge of the second surface in contact with the sliding surface, the protrusion provided on the first surface faces the cover.

Tenth Aspect

The tablet-containing packaging body according to the eighth or ninth aspect, wherein the inlet is a circle parallel to the imaginary plane, the sliding surface is rotationally symmetric about an imaginary central axis orthogonal to the imaginary plane, the imaginary central axis passes through a center of the inlet, and the sliding surface extends continuously from the inlet to a position where the sliding surface intersects the imaginary central axis within the accommodation portion.

Eleventh Aspect

The packaging body according to the second aspect, wherein the accommodation portion includes, within the accommodation portion:

a loading table suitable for loading the thin tablet; and a groove recessed toward a direction away from the inlet, the loading table includes an opposing surface that faces the inlet, and the groove is recessed from at least a portion of an outer edge of the opposing surface.

Twelfth Aspect

The packaging body according to eleventh aspect, wherein the groove is recessed from an entirety of the outer edge of the opposing surface.

Thirteenth Aspect

The packaging body according to the eleventh or twelfth aspect, further including a cover that at least partially covers the inlet.

Fourteenth Aspect

The packaging body according to the thirteenth aspect, wherein the accommodation member includes a margin extending from the inlet outside the accommodation portion, and the packaging body includes an adhesive layer that releasably adheres the cover to the margin.

Fifteenth Aspect

A tablet-containing packaging body including:

the packaging body described in any one of the eleventh to fourteenth aspects; and the thin tablet accommodated in the accommodation portion of the packaging body, wherein a portion of the thin tablet is positioned between the inlet and the groove.

Sixteenth Aspect

A tablet-containing packaging body including:

the packaging body described in the thirteenth or fourteenth aspect; and the thin tablet accommodated in the accommodation portion of the packaging body, wherein the thin tablet includes:

a body including two surfaces that are planes; and at least one protrusion provided on at least one of the surfaces, the two surfaces include a first surface and a second surface, one protrusion of the at least one protrusion is provided on the first surface, the first surface faces the cover in a loading state in which the thin tablet is loaded on the loading table, the second surface faces the loading table in the loading state, a portion of the thin tablet is positioned between the inlet and the groove in the loading state, and the protrusion provided on the first surface faces the cover in the loading state.

Seventeenth Aspect

The tablet-containing packaging body according to the sixteenth aspect, wherein another protrusion of the at least one protrusion is provided on the second surface, the loading table includes a receiving hole recessed from the opposing surface, the receiving hole is recessed toward a direction away from the inlet, and in the loading state, at least a portion of the protrusion provided on the second surface is received in the receiving hole.

Eighteenth Aspect

A method for manufacturing an accommodation member of a packaging body for containing a thin tablet, the accommodation member including:

an inlet; and an accommodation portion recessed from the inlet, and the accommodation member having a structure in which at least a portion of the thin tablet accommodated in the accommodation portion moves toward the inlet upon application of a force, by an object inserted from the inlet, to a portion of the thin tablet accommodated in the accommodation portion, the manufacturing method including:

providing a mold having a shape along the accommodation portion; and molding a sheet material along the mold to mold the accommodation member including the accommodation portion.

Nineteenth Aspect

An apparatus for manufacturing an accommodation member of a packaging body for containing a thin tablet, the accommodation member including:

an inlet; and an accommodation portion recessed from the inlet, and the accommodation member having a structure in which at least a portion of the thin tablet accommodated in the accommodation portion moves toward the inlet upon application of a force, by an object inserted from the inlet, to a portion of the thin tablet accommodated in the accommodation portion, the manufacturing apparatus including:

a mold having a shape along the accommodation portion; and a molding device that molds a sheet material along the mold.

Advantageous Effects of Invention

The present invention can provide a packaging body that is not liable to damage a thin tablet in comparison with the related art, a tablet-containing packaging body that is not liable to damage a thin tablet, a method for manufacturing an accommodation member of a packaging body that is not liable to damage a thin tablet, and an apparatus for manufacturing an accommodation member of a packaging body that is not liable to damage a thin tablet.

DETAILED DESCRIPTION

Figure 1:
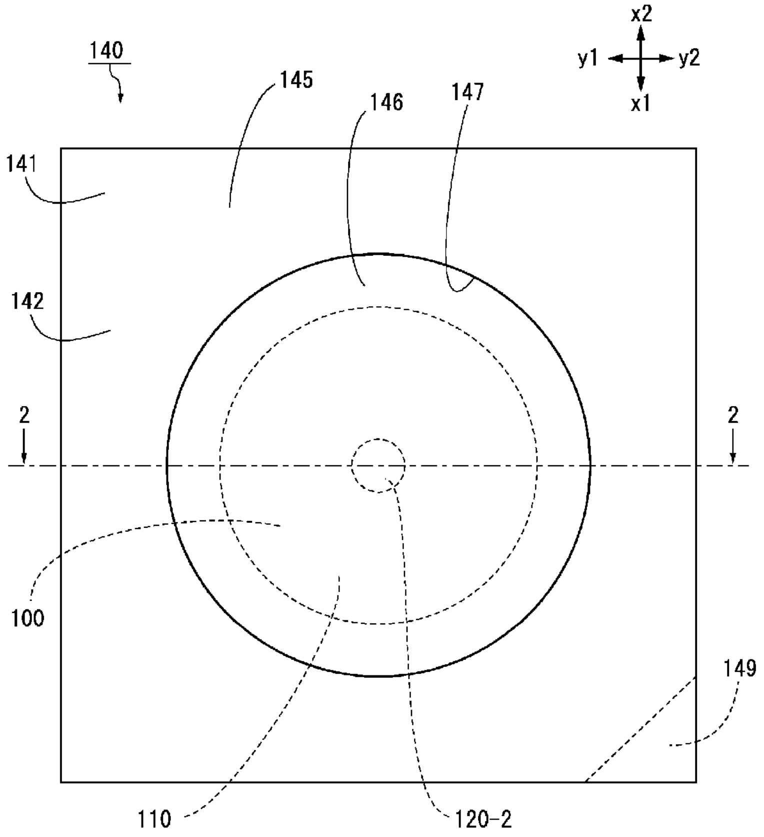
FIG. 1 is a bottom view of a tablet-containing packaging body of a first embodiment.

Thin tablets of first to sixth embodiments will be described below. The digits in the hundred's place of the reference numerals representing the components of the first to sixth embodiments are 1 to 6, respectively. Unless otherwise noted, components different only in the hundred's digit in different embodiments are each the same components.

An x-direction, a y-direction, and a z-direction being orthogonal to each other are used in the description given herein. The x-direction represents x1 direction and x2 direction opposite to each other. The y-direction represents y1 direction and y2 direction opposite to each other. The z-direction represents z1 direction and z2 direction opposite to each other. Such directions represent relative positional relationships unless otherwise noted, and do not limit the direction during actual use. The shapes of the components are not limited to the exact geometric shapes based on the expressions used herein, as long as the technical ideas of the embodiments disclosed herein are realized. The expressions by ordinal numbers such as "first" and "second" are intended to distinguish elements from one another, and the ordinal numbers can be used interchangeably to express the elements, as long as the same technical ideas are realized.

First Embodiment

Figure 2:
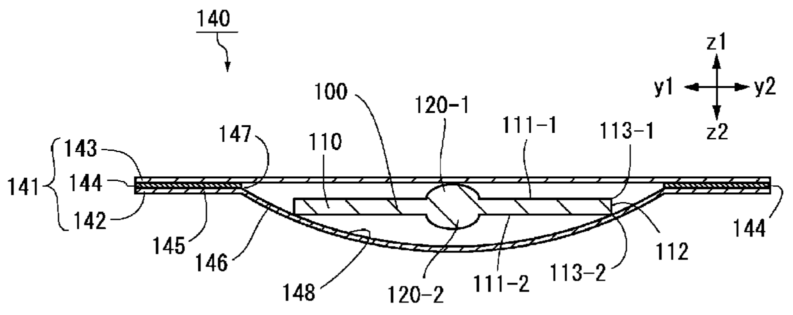
FIG. 2 is a cut-away view of the tablet-containing packaging body taken along line 2-2 of FIG. 1.

FIG. 1 is a bottom view (i.e., a view illustrating the z1 side when viewed from the z2 side) of a tablet-containing packaging body 140 according to a first embodiment. FIG. 2 is a cut-away view (portions other than the cross section are not illustrated) of the tablet-containing packaging body 140 taken along line 2-2 illustrated in FIG. 1. The tablet-containing packaging body 140 includes a thin tablet 100 and a packaging body 141 that packages the thin tablet 100. The packaging body of the present embodiment is referred to also as a release cover type blister packaging body.

(Thin Tablet)

Figure 3:
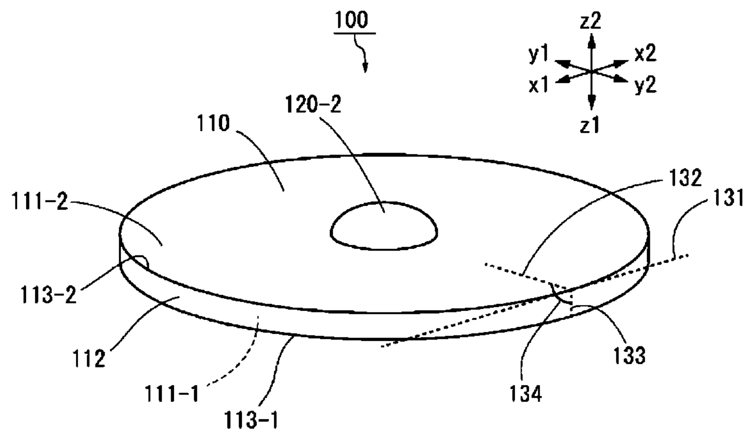
FIG. 3 is a perspective view of a thin tablet illustrated in FIG. 1.
Figure 4:
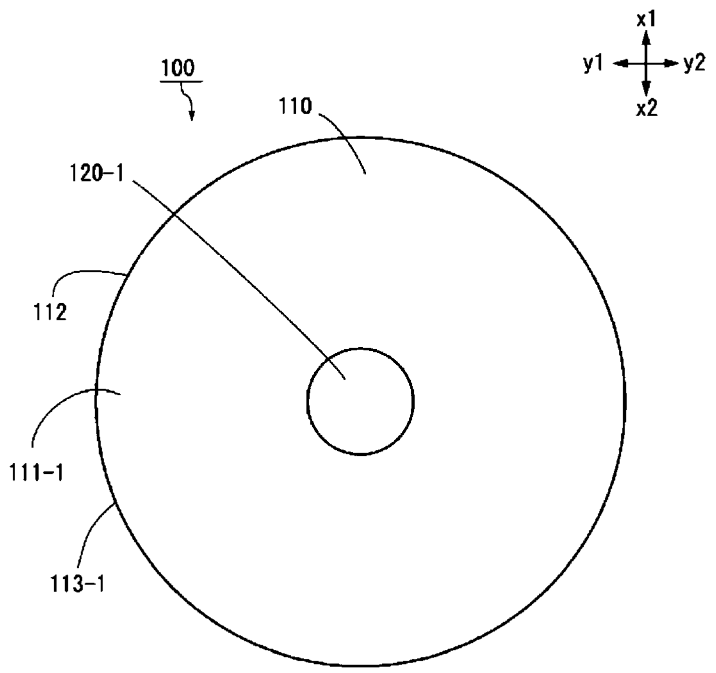
FIG. 4 is a bottom view of the thin tablet illustrated in FIG. 3.
Figure 5:
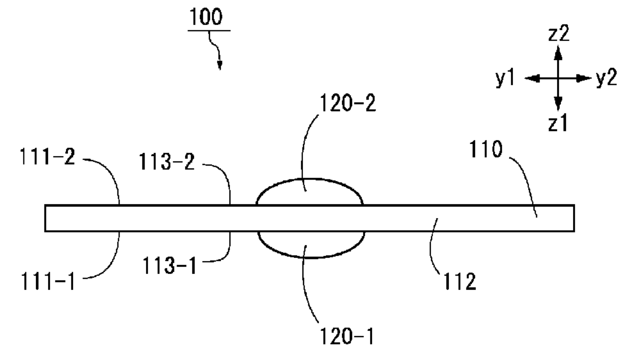
FIG. 5 is a front view of the thin tablet illustrated in FIG. 3.

FIG. 3 is a perspective view of the thin tablet 100 of the first embodiment. FIG. 4 is a bottom view of the thin tablet 100. FIG. 5 is a front view of the thin tablet 100. As illustrated in FIG. 5, the thin tablet 100 includes a thin cylindrical body 110 and further includes a first protrusion 120-1 and a second protrusion 120-2 both protruding from the body 110 (hereinafter sometimes referred to as the protrusion 120 without distinction).

(Body)

As illustrated in FIG. 3, the body 110 is a thin cylinder having a central axis parallel to the z-direction. As illustrated in FIG. 5, the body 110 includes a first surface 111-1, a second surface 111-2, and a side surface 112. The first surface 111-1 and the second surface 111-2 (hereinafter sometimes referred to as the surface 111 without distinction) are of the same shape, and have shapes that are mutually translated in the z-direction. The first surface 111-1 is a circle facing in the z1 direction and parallel to the xy plane (FIG. 4), and is enclosed by a first outer edge 113-1 (FIG. 4). The second surface 111-2 is a circle facing in the z2 direction and parallel to the xy plane, and is enclosed by a second outer edge 113-2. Hereinafter, the first outer edge 113-1 and the second outer edge 113-2 are sometimes referred to as the outer edge 113.

As illustrated in FIG. 3, the side surface 112 has a cylindrical shape that connects the first outer edge 113-1 and the second outer edge 113-2 in the normal direction (z-direction) of the two surfaces 111. An angle 134 between the surface 111 and the side surface 112 is 90 degrees. The angle 134 between the surface 111 and the side surface 112 is the angle 134 between a first imaginary line 132 along the surface 111 orthogonal to an imaginary tangent line 131 of the outer edge 113 and a second imaginary line 133 along the side surface 112 orthogonal to the imaginary tangent line 131 of the outer edge 113 in the thin tablet 100. In other words, the angle 134 of the side surface 112 with respect to the surface 111 in the rotationally symmetric body 110 is expressed as the angle 134 formed by the surface 111 and the side surface 112 when the body 110 is cut in a plane passing through the center of rotation.

The thickness of the body 110 of the present embodiment is 0.8 mm. In other examples, the thickness of the body 110 is 0.5 mm or greater and 1.5 mm or less, for example. In other examples, the thickness of the body 110 is 0.5 mm or greater and 1.2 mm or less, for example. The thickness of the body 110 is defined parallel to the z-direction orthogonal to the surface 111. In one example, the weight of the thin tablet 100 is 200 mg and the thickness thereof is approximately 1.1 mm. In one example, the weight of the thin tablet 100 is 250 mg and the thickness thereof is approximately 1.3 mm.

The maximum width or diameter of the body 110 of the present embodiment is 14 mm. In other examples, the maximum width of the surface 111 is greater than 14 mm. The width of the surface 111 is defined in a direction orthogonal to the thickness of the body 110.

The body 110 can be in the form of a tablet, such as a truly flat tablet, a round-corner flat tablet, or an angled-corner flat tablet.

(Protrusion)

As illustrated in FIG. 5, the protrusion 120 is provided on each of the two surfaces 111. The first protrusion 120-1 protrudes in the z1 direction from the first surface 111-1. The second protrusion 120-2 protrudes from the second surface 111-2 in the z2 direction. The position and shape of the second protrusion 120-2 with respect to the second surface 111-2 and the position and shape of the first protrusion 120-1 with respect to the first surface 111-1 are mirror symmetrical with each other with respect to an imaginary center plane parallel to the xy plane.

As illustrated in FIG. 3, the protrusion 120 has a convex smooth surface. As illustrated in FIG. 4, the protrusion 120 is a rotating body having the same imaginary axis as the body 110 as a center. As a result, the thin tablet 100 is also a rotating body having the same imaginary axis as the body 110 and the protrusions 120 as a center. The protrusion 120 and the body 110 are integrally formed. A boundary between the protrusion 120 and the body 110 is circular. When viewed from the z-direction, the entirety of the protrusion 120 does not extend out of the contour of the boundary between the protrusion 120 and the body 110. The cross section of the protrusion 120 parallel to the xy plane decreases with the distance from the surface 111 in the z-direction increases.

As illustrated in FIG. 4, the area proportion of the protrusion 120 to the surface 111 is 5%. In other words, a planar portion of the surface 111 is necessarily exposed to the outside. The area proportion of the protrusion 120 to the surface 111 is preferably 90% or less. Preferably, the height of the protrusion 120 from the surface 111 is 100% or less of the thickness of the body 110. In the present embodiment, the height of the protrusion 120 from the surface 111 is 100% of the thickness of the body 110. The protrusion 120 of the present embodiment has a shape partially cut out from a sphere, and is a small portion obtained by cutting a sphere into 6:1 in a plane orthogonal to the diameter.

The protrusion 120 is formed at a position overlapping with the center of gravity of the body 110 in the normal direction or the z-direction of the surface 111. That is, the center of the circle defining the boundary between the protrusion 120 and the surface 111 coincides with the center of the circle defining the surface 111.

(Gap)

Figure 6:
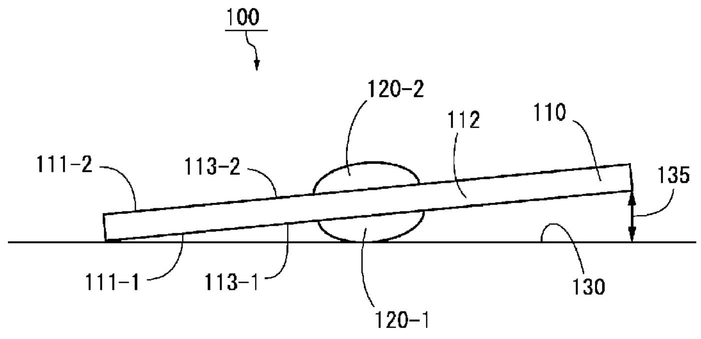
FIG. 6 is a front view of the thin tablet illustrated in FIG. 3 disposed on an external plane.

FIG. 6 is a front view in an exemplary state in which the thin tablet 100 is placed on an infinitely-spreading imaginary external plane 130. The first surface 111-1 faces the external plane 130. With the first protrusion 120-1 in contact with the external plane 130, a gap 135 of 0.1 mm or greater is formed between at least a portion of the first outer edge 113-1 enclosing the first surface 111-1 provided with the first protrusion 120-1 and the external plane 130. The protrusion 120 is preferably formed such that the gap 135 is 0.1 mm or greater. When the thin tablet 100 is placed on the imaginary external plane 130 under gravity, it is preferable to form the protrusion 120 such that the gap 135 of 0.1 mm or greater is formed without any external force.

FIG. 6 illustrates a state in which the left side of the first outer edge 113-1 is in contact with the external plane 130. Since the first outer edge 113-1 is circular and further the protrusions 120 overlap with the center of gravity of the body 110 in the z-direction illustrated in FIG. 5, no limitation is placed on which portion of the first outer edge 113-1 is in contact with the external plane 130 under gravity. Note that the location where the thin tablet 100 is actually placed is not limited to a complete plane.

(Orally Disintegrating Tablet)

The thin tablet 100 is an orally disintegrating tablet in one example. The thin tablet 100 has a disintegration time in water of approximately 7 seconds or less, and preferably 5 seconds or less in one example. The thin tablet 100 has an oral disintegration time of 6 seconds or less, preferably 5 seconds or less in one example.

The medicinal ingredient contained in the thin tablet 100 is a pharmaceutical ingredient or a nutritional component in foods and health foods. The medicinal ingredient may be added alone, or may be coated or granulated for the purpose of slow release, bitterness masking or the like. Note that the application, type and the like of the medicinal ingredient contained in the thin tablet 100 are not particularly limited.

In addition to the medicinal ingredient, the thin tablet 100 can contain, as necessary, other optional pharmaceutically acceptable ingredients such as excipients, surfactants, lubricants, acidulants, sweeteners, flavoring agents, spices, colorants, and stabilizers. As these optional ingredients, for example, the ingredients described in the Japanese Pharmaceutical Excipients Dictionary (Yakuji Nippo, Ltd.) and the Japanese Pharmacopeia can be used. Furthermore, as long as the desired effect of the present invention is achieved, the blending proportions of the respective ingredients are not particularly limited, and can be determined, as appropriate, by a person skilled in the art.

A material 170 for the thin tablet 100 described above (FIG. 6) is a mixture obtained by mixing, in a disintegrable particle composition, a medicinal ingredient (or a pharmaceutical composition containing the medicinal ingredient) and other optional ingredients as described above. An apparatus for manufacturing the thin tablet 100 is an appropriate tableting machine known, except for the shape of a mold, to those skilled in the art. The thin tablet 100 is made, for example, with a tableting compression force of approximately 2 to 20 kN, preferably approximately 5 to 20 kN. A method called "external lubrication tableting method" may also be used in which a lubricant such as magnesium stearate is previously sprayed or applied to a mold of a tableting machine (referred to also as mortar-pestle).

The disintegrable particle composition contains, for example, an acid type carboxymethyl cellulose as a disintegrant component. Various optional components known to those skilled in the art may be appropriately added to and mixed with the disintegrable particle composition, for example, for the purpose of adjusting various characteristics such as disintegration force, binding force, and feeling of taking tablet. Examples of such ingredients can include fluidizers, sweeteners, spices, and colorants.

The amount of each of the components blended in the disintegrable particle composition can be determined, as appropriate, by a person skilled in the art depending on the type of each of the components, the type and application of the medicinal ingredient to be used in the disintegrable particle composition, the application of the orally disintegrating tablet that is the final product, and the like.

(Easy-to-Take Solid Formulation)

The thin tablet 100 is an easy-to-take solid formulation in addition to or instead of being an orally disintegrating tablet. "Easy-to-take" generally means that, as a property or characteristic of a solid formulation or the like, the solid formulation is easy to drink (easy to swallow). In one example, the thin tablet 100 includes a gelling agent that exhibits slipperiness when touched with water.

(Modified Example of Thin Tablet)

In other examples, the angle between the surface and the side surface is less than 90 degrees. In such other examples, the second surface is concentric with the first surface, and, further, is a circle with a radius smaller than that of the first surface, for example. In other words, it is frustoconical.

(Packaging Body)

As illustrated in FIG. 2, the packaging body 141 includes an accommodation member 142, a cover 143, and an adhesive layer 144.

The accommodation member 142 is formed by processing a thin sheet material. The accommodation member 142 includes a margin 145 that extends parallel to the xy plane, and an accommodation portion 146 recessed in the z2 direction from the margin 145. The accommodation portion 146 includes a sliding surface 148 for sliding the thin tablet 100 within the accommodation portion 146.

The accommodation member 142 includes an inlet 147 defining a boundary between the margin 145 and the accommodation portion 146 at the outer edge. The inlet 147 is open in the z1 direction. The accommodation portion 146 is recessed from the inlet 147 in the z2 direction. As illustrated in FIG. 1, the inlet 147 is circular. The margin 145 extends from the inlet 147 outside the accommodation portion 146.

Figure 7:
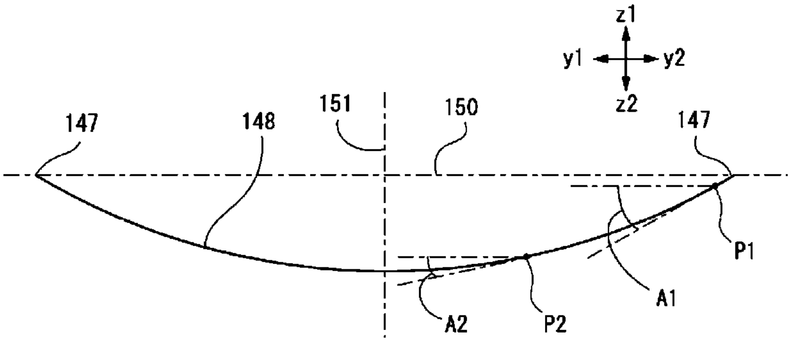
FIG. 7 is a cut-away view of a sliding surface illustrated in FIG. 2.

FIG. 7 is a cut-away view (portions other than the cross section are not illustrated) of the sliding surface 148 in the same cross section as in FIG. 2. The inlet 147 extends parallel to an imaginary plane 150 parallel to the xy plane. The sliding surface 148 does not overlap with any other portion of the accommodation portion 146 in the z-direction orthogonal to the imaginary plane 150. That is, when looking in the z2 direction from the z1 direction in a state in which the cover 143 (FIG. 2) is absent, the entirety of the sliding surface 148 is visible from the inlet 147. The sliding surface 148 is inclined with respect to the imaginary plane 150.

The sliding surface 148 is rotationally symmetric about an imaginary central axis 151 orthogonal to the imaginary plane 150. The imaginary central axis 151 passes through the center of the inlet 147. The sliding surface 148 extends continuously from the inlet 147 to a position where it intersects the imaginary central axis 151 within the accommodation portion 146. In one example, the sliding surface 148 has a shape obtained by cutting one spherical surface in the imaginary plane 150.

The inclination angle of the sliding surface 148 with respect to the imaginary plane 150 is not less than 0 degrees and not greater than 70 degrees at any position. The inclination angle of the sliding surface 148 in a region closest to the inlet 147 is greater than 0 degrees. The inclination angle is preferably not less than 0 degrees and not greater than 45 degrees, and more preferably not less than 0 degrees and not greater than 30 degrees, because the thin tablet 100 easily slides upon application of a force in a direction orthogonal to the z direction. The inclination angle of the sliding surface 148 with respect to the imaginary plane 150 decreases as the distance from the inlet 147 increases. The inclination angle changes gently as the distance from the inlet 147 increases. For example, in the cutting plane illustrated in FIG. 7, a point P2 is farther from the inlet 147 than a point P1. An inclination angle A2 at the point P2 is smaller than an inclination angle A1 at the point P1.

The cover 143 in FIG. 2 is formed of a single continuous sheet material parallel to the xy plane and is positioned on the z1 side of the accommodation member 142. The cover 143 generally covers the entirety of the inlet 147 without slack and covers the margin 145. The adhesive layer 144 extending parallel to the xy plane is sandwiched between the cover 143 and the margin 145 in the z-direction. The adhesive layer 144 releasably adheres the cover 143 to the margin 145. The cover 143 includes a handle 149 on a portion of the outer edge. There is no adhesive layer 144 between the handle 149 and the margin 145.

As illustrated in FIG. 2, in the accommodation portion 146, the second surface 111-2 of the thin tablet 100 faces the sliding surface 148 and the first surface 111-1 faces the cover 143. In one state, in the thin tablet 100, the surfaces 111 are parallel to the xy plane. Note that the thin tablet 100 may move slightly from the state illustrated in FIG. 2 within the accommodation portion 146. In the state illustrated in FIG. 2, the second outer edge 113-2 is in contact with the sliding surface 148. The first protrusion 120-1 provided on the first surface 111-1 faces the cover 143. The end on the z1 side of the first protrusion 120-1 is in contact with the cover 143.

(Use Method)

Figure 8:
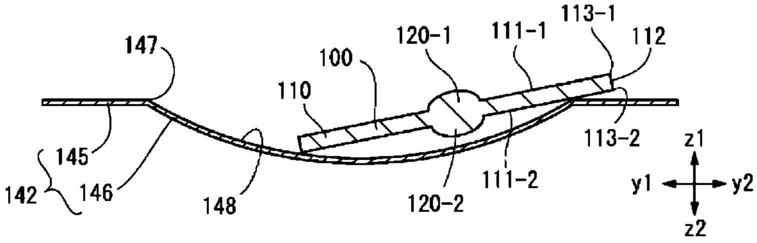
FIG. 8 is a cut-away view of an accommodation member illustrated in FIG. 2 and the moved thin tablet.

FIG. 8 is a cut-away view of the accommodation member 142 and the moved thin tablet 100 in the same cross section as in FIG. 2. FIG. 8 differs from FIG. 2 in that the thin tablet 100 is partially outside from the inlet 147.

As illustrated in FIG. 2, first, the user holds the tablet-containing packaging body 140 generally with the cover 143 up and the accommodation member 142 down. The user then peels the cover 143 from the accommodation member 142 with the handle 149 (FIG. 1) to expose the thin tablet 100 to the outside. The user then inserts his/her finger through the inlet 147 to touch at least either the first surface 111-1 or the first protrusion 120-1 of the thin tablet 100. The user then applies a force in the z2 direction to the thin tablet 100 with a finger and applies a force in the y2 direction to the thin tablet 100.

As a result, the thin tablet 100 partially moves outside from the inlet 147, as illustrated in FIG. 8. The user then pinches the first surface 111-1 and the second surface 111-2 to completely take out the thin tablet 100. In this manner, the accommodation member 142 has a structure in which at least a portion of the thin tablet 100 accommodated in the accommodation portion 146 moves toward the inlet 147 upon application of a force by the finger as an object inserted from the inlet 147 to a portion of the thin tablet 100 accommodated in the accommodation portion 146. More specifically, upon application of the force, an other portion of the thin tablet 100 accommodated in the accommodation portion 146 protrudes from the inlet 147.

(Manufacturing Method)

Figure 9:
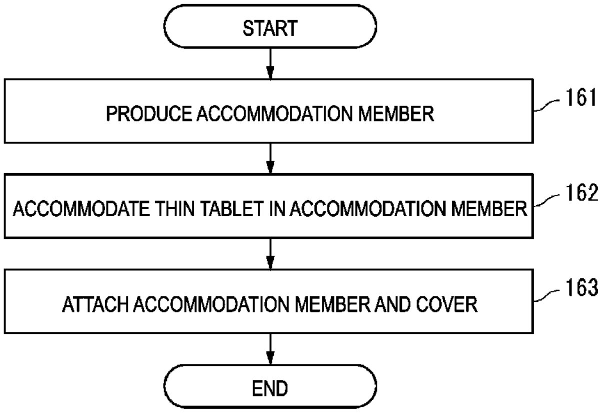
FIG. 9 is a flow chart illustrating a method for manufacturing the tablet-containing packaging body illustrated in FIG. 1.

FIG. 9 is a flow chart illustrating a method for manufacturing the tablet-containing packaging body 140. First, in step 161 in FIG. 9, the accommodation member 142 as illustrated in FIG. 2 is produced by vacuum molding, for example. Next, in step 162 in FIG. 9, the thin tablet 100 is accommodated in the accommodation portion 146 in a state as illustrated in FIG. 2. In step 163 in FIG. 9, the accommodation member 142 and the cover 143 are releasably adhered to each other by the adhesive layer 144, as illustrated in FIG. 2.

Figure 10:
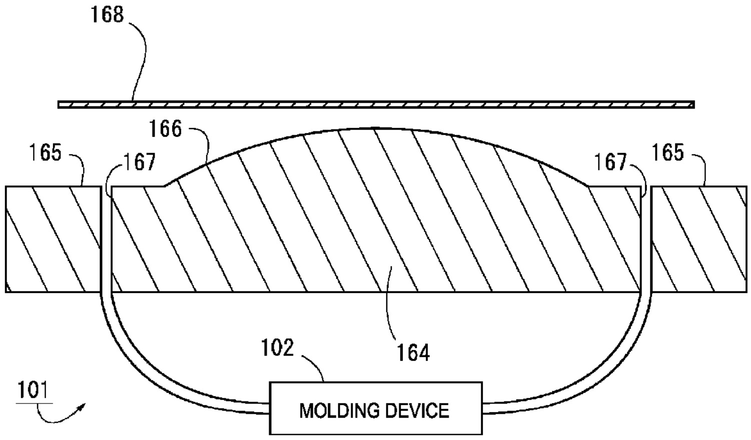
FIG. 10 is a cut-away view of an apparatus for manufacturing the accommodation member illustrated in FIG. 1 and a sheet material before shaping.
Figure 11:
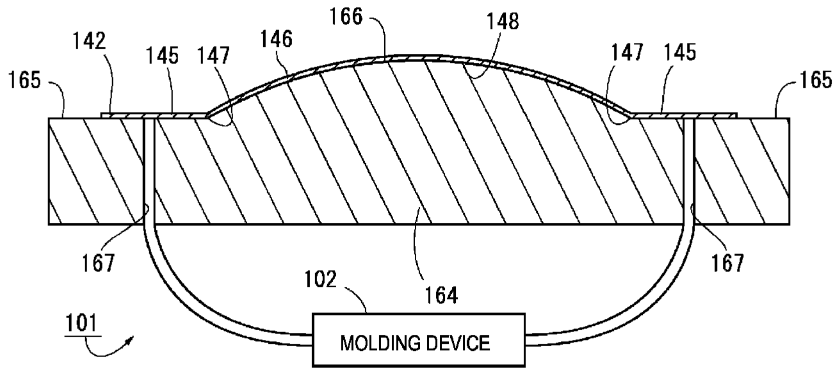
FIG. 11 is a cut-away view of the apparatus for manufacturing the accommodation member illustrated in FIG. 1 and the accommodation member after molding.

FIGS. 10 and 11 are cut-away views (portions other than the cross section are not illustrated) of a manufacturing apparatus 101 and a sheet material 168, which describe a method for producing the accommodation member 142 by vacuum molding. FIG. 10 illustrates the state before shaping, and FIG. 11 illustrates the state after molding. The manufacturing apparatus 101 includes a mold 164 and a molding device 102. In manufacturing, the mold 164 as illustrated in FIG. 10 is prepared. Note that a mold, which is opposite in concave/convex shape to the mold 164, may be used.

The mold 164 includes a planar first molding surface 165 for molding the margin 145 (FIG. 2) and a curved second molding surface 166 for molding the accommodation portion 146 (FIG. 2). The second molding surface 166 is enclosed by the first molding surface 165. The shapes of the first molding surface 165 and the second molding surface 166 generally conform to the shapes of the surface of the margin 145 (FIG. 2) and the sliding surface 148 (FIG. 2), except that they are opposite in concave/convex shape. The mold 164 is provided with a plurality of suction holes 167 in the first molding surface 165 or the second molding surface 166. The suction holes 167 may be provided elsewhere.

First, the sheet material 168, which serves as the material for the accommodation member 142 (FIG. 2), is heated. Next, the sheet material 168 is brought close to the first molding surface 165 and the second molding surface 166. Next, suction is performed via the plurality of suction holes 167 by the molding device 102, which is a suction device, and thus the space between the first molding surface 165 and the second molding surface 166 and the sheet material 168 is brought into a vacuum state. As a result, as illustrated in FIG. 11, the sheet material 168 is molded along the first molding surface 165 and the second molding surface 166.

(Material)

Examples of the material for the sheet material 168 (FIG. 10) for forming the accommodation member 142 include thermoplastic resins and aluminum. Examples of thermoplastic resins used in the sheet material 168 include polyvinyl chloride, polyvinylidene chloride, polychlorotrifluoroethylene, polystyrene, polyamide, polyimide, polyurethane, nylon, petroleum resins; polyesters such as polyethylene terephthalate (PET) and polybutylene terephthalate (PBT); fluorinated resin copolymers such as polytetrafluoroethylene, polyvinyl fluoride, polyvinylidene fluoride and ethylene/ethylene tetrafluoride copolymers; acrylic resins such as ABS resins (acrylonitrile/butadiene/styrene), AS resins (acrylonitrile/styrene) and PMMA resins; and polyolefins such as polyethylene, polypropylene, cyclic olefin polymers and cyclic olefin copolymers (COP). The sheet material 168 may be formed from one of the thermoplastic resins described above, or may be formed by laminating two or more thermoplastic resins selected from the thermoplastic resins described above. The sheet material 168 may be formed by depositing an inorganic oxide (silicon oxide, titanium oxide, or aluminum oxide) and at least one of metals on the thermoplastic resin described above. When aluminum is used in the sheet material 168, the thermoplastic resin described above may be laminated to aluminum, or aluminum may be coated with the thermoplastic resin described above. Examples of lamination methods used to form the sheet material 168 include a dry lamination method, an extrusion lamination method, a hot melt lamination method, a wet lamination method, and a thermal (heat) lamination method.

Examples of the material for the cover 143 includes the materials, described above, for forming the accommodation member 142.

Examples of the material for the adhesive layer 144 include resins. The resin that forms the adhesive layer 144 contains an antioxidant as necessary. Examples of the resin for forming the adhesive layer 144 include polyolefin, ethylene-methacrylate-glycidyl acrylate ternary copolymers; and materials obtained by grafting monobasic unsaturated fatty acids, dibasic unsaturated fatty acids, or their anhydrides onto various polyolefins (such as maleic acid-grafted ethylene-vinyl acetate copolymers and maleic acid-grafted ethylene-α-olefin copolymers). Examples of monobasic unsaturated fatty acids include acrylic acid and methacrylic acid. Examples of dibasic unsaturated fatty acids include maleic acid, fumaric acid, and itaconic acid. Examples of antioxidants include known antioxidants such as hindered phenol-based antioxidants, phosphorous-based antioxidants, and thioether antioxidants. The thickness of the adhesive layer 144 is not particularly limited, but is preferably not less than 3 μm and not greater than 50 μm, and more preferably not less than 5 μm and not greater than 30 μm.

In one example, the accommodation member 142 is formed from a material obtained by coating aluminum with polypropylene, and a polyolefin is used as the cover 143. The accommodation member 142 and the cover 143 are thermally cured (heat sealed) via the adhesive layer 144. In the other embodiments described herein, the same manufacturing apparatus and the same materials are used except for the shape of the mold, and a tablet-containing packaging body is manufactured by the same manufacturing method.

(Modified Example of Packaging Member)

In other examples, a region that is not the sliding surface 148 is included between the sliding surface 148 and the inlet 147. It is preferred that the sliding surface 148 and the inlet 147 be continuous for the purpose of moving the thin tablet 100 smoothly from the sliding surface 148 through the inlet 147 to the outside. In other examples, the inclination angle of the sliding surface 148 with respect to the imaginary plane 150 may be constant. In other examples, the cover 143 at least partially covers the inlet 147. That is, the cover 143 entirely or partially covers the inlet 147.

(Modified Example of Thin Tablet)

The thin tablet 100 may not include the protrusions 120 illustrated in FIG. 5, and the number of the protrusions 120 may be one or not less than three. The protrusion 120 may be provided at a position different from the position illustrated in FIG. 5. For example, if the protrusion 120 does not overlap with the center of gravity of the body 110, the body 110 does not rotate about the protrusion 120 and the body 110 is easily stable. The protrusion 120 may be a cylindrical column, a polygonal prism, or other column. The tip of the protrusion 120 farther from the body 110 may be planar. The protrusion 120 may be formed in a letter shape when viewed from the z-direction. The protrusion 120 can be a circular cone, a pyramid, or any other cone. The polygonal column and cone may be rounded in corners. The contour of the protrusion 120 when viewed from the z-direction may be a complex shape, such as a flower shape or a fish shape.

The outer edge 113 of the body 110 and the protrusion 120 may be different in contour, when viewed from the z-direction. When viewed from the z-direction, the outer edge 113 may be polygonal. The corners of the polygonal outer edge 113 may be rounded. The outer edge 113 may have any other shape. The shape of the outer edge 113 may be a complex shape such as a flower shape or a fish shape. The body 110 may be frustoconical, frustopyramidal, or otherwise frustoconical.

(Summary 1)

According to the present embodiment, the thin tablet 100 is easily taken out of the packaging body 141 because at least a portion of the thin tablet 100 moves toward the inlet 147 upon application of a force to a portion of the thin tablet 100 with an object such as a finger.

According to the present embodiment, the thin tablet 100 is easily taken out of the packaging body 141 because an other portion of the thin tablet 100 protrudes from the inlet 147 upon application of the force to the portion of the thin tablet 100 with the object such as a finger.

According to the present embodiment, the sliding surface 148 does not overlap with any other portion of the accommodation portion 146 in a direction orthogonal to the imaginary plane 150, and, further, the sliding surface 148 is inclined with respect to the imaginary plane 150. So, an other portion of the thin tablet 100 can be easily protruded from the inlet 147 by moving the thin tablet 100 along the sliding surface 148.

According to the present embodiment, the inclination angle of the sliding surface 148 with respect to the imaginary plane 150 is not less than 0 degrees and not greater than 70 degrees, and the inclination angle of the sliding surface 148 in the region closest to the inlet 147 is greater than 0 degrees. So, it is easy to apply a force to the thin tablet 100 in a direction parallel to the imaginary plane 150, and an other portion of the thin tablet 100 can be easily protruded from the inlet 147.

According to the present embodiment, the inclination angle of the sliding surface 148 with respect to the imaginary plane 150 decreases as the distance from the inlet 147 increases. As a result, movement in a direction orthogonal to the imaginary plane 150 is reduced while movement in a direction parallel to the imaginary plane 150 is increased. So, the thin tablet 100 can be moved smoothly.

According to the present embodiment, the cover 143 that at least partially covers the inlet 147 makes it possible to accommodate the thin tablet 100 stably in the accommodation portion 146.

According to the present embodiment, because the packaging body 141 includes the adhesive layer 144 that releasably adheres the cover 143 to the margin 145, it is not necessary to tear open the cover 143, making it difficult to break the thin tablet 100.

According to the present embodiment, when the thin tablet 100 is positioned within the accommodation portion 146 with the outer edge 113 of the second surface 111-2 in contact with the sliding surface 148, the protrusion 120 provided on the first surface 111-1 faces the cover 143. So, the thin tablet 100 is less likely to move in the accommodation portion 146 and less likely to be damaged in comparison with the case when the protrusion 120 is absent. Further, because the protrusion 120 faces the cover 143, rocking of the thin tablet 100 can be restricted without thickening the body 110, making it difficult to damage the thin tablet 100.

According to the present embodiment, the inlet 147 is a circle parallel to the imaginary plane 150 and the sliding surface 148 is rotationally symmetric about the imaginary central axis 151 orthogonal to the imaginary plane 150. So, the thin tablet 100 is less likely to be damaged even when the thin tablet 100 is moved in any direction. Further, the imaginary central axis 151 passes through the center of the inlet 147 and the sliding surface 148 extends continuously from the inlet 147 to a position where it intersects the imaginary central axis 151 within the accommodation portion 146. So, the thin tablet 100 is easily moved smoothly to the position where the sliding surface 148 intersects the imaginary central axis 151.

(Summary 2)

According to the present embodiment, the protrusion 120 is provided on the surface 111. So, when the thin tablet 100 is placed on the external plane 130 (e.g., a floor), the gap 135 is formed between the outer edge 113 of the surface 111 and the external plane 130, and the thin tablet 100 is thus easy to take.

According to the present embodiment, in the case where the angle formed by the surface 111 and the side surface 112 is 90 degrees or less, if the protrusion 120 is absent, the thin tablet 100 is particularly difficult to take. However, by virtue of the protrusion 120, the gap 135 is formed between the outer edge 113 of the surface 111 and the external plane 130, and the thin tablet 100 is thus easy to take.

According to the present embodiment, the thickness of the body 110 is 0.5 mm or greater and 1.5 mm or less, or 0.5 mm or greater and 1.2 mm or less. So, the gap 135 is formed between the surface 111 and the external plane 130 in the thin tablet 100 which is difficult to pinch, thereby making it possible to easily take the thin tablet 100.

According to the present embodiment, in the thin tablet 100 that is difficult to pinch because the maximum width of the surface 111 is 14 mm or greater, the gap 135 is formed between the surface 111 and the external plane 130, thereby making it easy to take the thin tablet 100.

According to the present embodiment, the area proportion of the protrusion 120 to the surface 111 is 90% or less, and thus it is possible to easily take the thin tablet 100 while preventing the thin tablet 100 from becoming thicker than necessary by virtue of the protrusion 120.

According to the present embodiment, the height of the protrusion 120 from the surface 111 is 100% or less of the thickness of the body 110, and thus it is possible to easily take the thin tablet 100 while preventing the thin tablet 100 from becoming thicker than necessary by virtue of the protrusion 120.

According to the present embodiment, the gap 135 of 0.1 mm or greater is formed between at least a portion of the outer edge 113 and the external plane 130, and thus the thin tablet 100 is easily taken with a person's finger.

According to the present embodiment, the protrusion 120 overlaps with the center of gravity of the body 110, and thus the body 110 is easily tilted about the protrusion 120 in a variety of orientations.

According to the present embodiment, the protrusion 120 is provided on each of the two surfaces 111. So, even when any surface 111 faces the external plane 130, the gap 135 can be formed between the surface 111 and the external plane 130, and the thin tablet 100 is easy to take.

According to the present embodiment, when the thin tablet 100 is at least either an orally disintegrating tablet or an easy-to-take solid formulation, it is possible to quickly take out and pick up the thin tablet 100 by virtue of the presence of the gap 135. So, it is easy to prevent the thin tablet 100 from disintegrating and gelling while it is being picked up.

According to the present embodiment, the protrusions 120 make the thin tablet 100 both difficult to move within the packaging body 141 and easy to pick up, and thus the structure is simpler in comparison with the case when separate mechanisms are provided.

Second Embodiment

Figure 12:
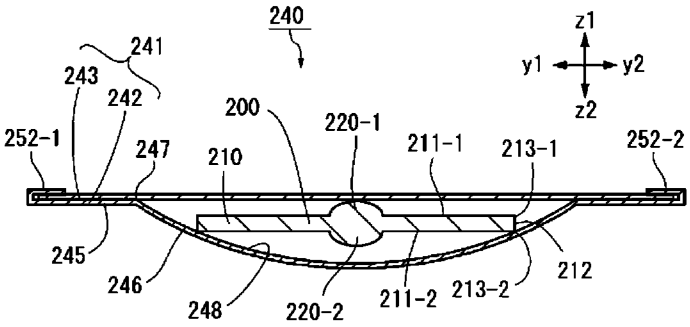
FIG. 12 is a cut-away view of a tablet-containing packaging body of a second embodiment.

FIG. 12 is a cut-away view of the tablet-containing packaging body 240 of a second embodiment. The cutting plane illustrated in FIG. 12 is obtained at the same position as the cutting surface illustrated in FIG. 2 in the first embodiment. A tablet-containing packaging body 240 of the present embodiment does not include the adhesive layer 144 illustrated in FIG. 2. In other words, in the present embodiment, an accommodation member 242 and a cover 243 are not adhered to each other in the z-direction.

The accommodation member 242 includes a first barb 252-1 and a second barb 252-2 (hereinafter sometimes referred to as the barb 252 without distinction). The first barb 252-1 extends in the z1 direction from the end edge on the y1 side of a margin 245 and then extends in the y2 direction. Since the cover 243 is sandwiched between the margin 245 and the first barb 252-1, it does not move substantially in the z-direction (at least to such an extent that a thin tablet 200 moves outside from an inlet 247). Also, the cover 243 does not move substantially in the y1 direction because it is blocked by the first barb 252-1. The second barb 252-2 extends in the z1 direction from the end edge on the y2 side of a margin 245 and then extends in the y1 direction. Since the cover 243 is sandwiched between the margin 245 and the second barb 252-2, it does not move substantially in the z-direction. Also, the cover 243 does not move substantially in the y2 direction because it is blocked by the second barb 252-2.

The cover 243 only moves in the x-direction along the barbs 252. When opening the packaging body, the user shifts the cover 243 in the x-direction, and thus the cover 243 and the accommodation member 242 are separated from each other. As a result, the thin tablet 200 is exposed to the outside. In other examples, the cover 243 may be slidable relative to the accommodation member 242 such that the inlet 247 can be opened and closed.

According to the present embodiment, the thin tablet 200 is exposed to the outside simply by sliding the cover 243, and thus the thin tablet 200 is less likely to break in comparison with the case when the cover 243 is torn with the thin tablet 200.

Third Embodiment

Figure 13:
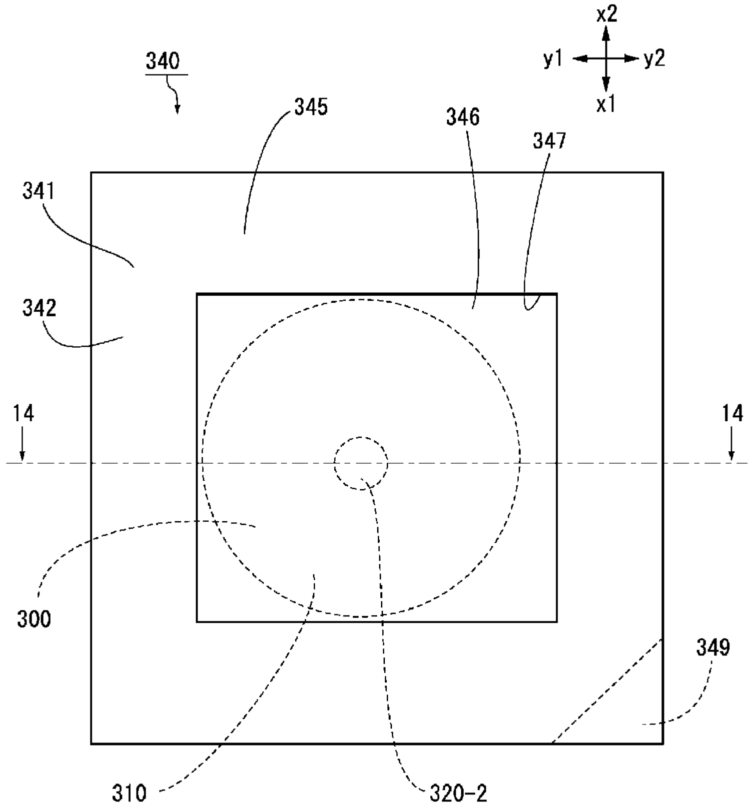
FIG. 13 is a bottom view of a tablet-containing packaging body of a third embodiment.
Figure 14:
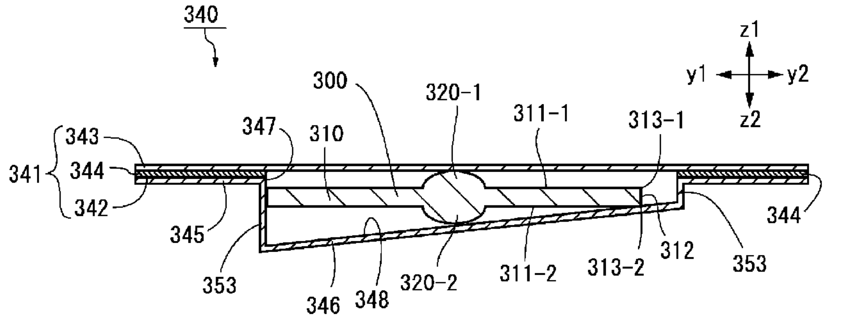
FIG. 14 is a cut-away view of the tablet-containing packaging body taken along line 14-14 of FIG. 13.

FIG. 13 is a bottom view (i.e., a view illustrating the z1 side when viewed from the z2 side) of a tablet-containing packaging body 340 of a third embodiment. FIG. 14 is a cut-away view of the tablet-containing packaging body 340 taken along line 14-14 of FIG. 13. The cutting plane illustrated in FIG. 14 is obtained at the same position as the cutting surface illustrated in FIG. 2 in the first embodiment. A packaging body 341 includes an accommodation member 342, a cover 343, and an adhesive layer 344.

The accommodation member 342 is formed by processing a thin sheet material. As illustrated in FIG. 14, the accommodation member 342 includes a margin 345 that extends parallel to the xy plane, and an accommodation portion 346 recessed in the z2 direction from the margin 345. The accommodation portion 346 includes a sliding surface 348 for sliding a thin tablet 300 within the accommodation portion 346.

The accommodation member 342 includes an inlet 347 defining a boundary between the margin 345 and the accommodation portion 346 at the outer edge. The inlet 347 is open in the z1 direction. The accommodation portion 346 is recessed from the inlet 347 in the z2 direction. As illustrated in FIG. 13, the inlet 347 is rectangular. The margin 345 extends from the inlet 347 outside the accommodation portion 346.

The accommodation portion 346 includes a tubular wall 353 extending in the z2 direction from an outer edge of the inlet 347 to an outer edge of the sliding surface 348. The inlet 347 extends parallel to the xy plane (i.e., parallel to the same imaginary plane as in FIG. 7). The sliding surface 348 does not overlap with any other portion of the accommodation portion 346 in the z-direction orthogonal to the xy plane. That is, when looking the z2 side from the z1 side in a state in which the cover 343 is absent, the entirety of the sliding surface 348 is visible from the inlet 347.

The sliding surface 348 is a plane that is inclined with respect to the xy plane. That is, the inclination angle of the sliding surface 348 with respect to the xy plane is constant. The inclination angle is greater than 0 degrees and not greater than 30 degrees. In the z-direction, the distance between the end edge on the y1 side of the sliding surface 348 and the inlet 347 is greater than the distance between the end edge on the y2 side of the sliding surface 348 and the inlet 347. The sliding surface 348 extends parallel to the x-direction in the same cross section as in FIG. 14.

The cover 343 is formed of a single continuous sheet material parallel to the xy plane and is positioned on the z2 side of the accommodation member 342. The cover 343 generally covers the entirety of the inlet 347 without slack and covers the margin 345. The adhesive layer 344 extending parallel to the xy plane is sandwiched between the cover 343 and the margin 345 in the z-direction. The adhesive layer 344 releasably adheres the cover 343 to the margin 345. The cover 343 includes a handle 349 on a portion of the outer edge. There is no adhesive layer 344 between the handle 349 and the margin 345.

As illustrated in FIG. 14, in the accommodation portion 346, the second surface 311-2 of the thin tablet 300 faces the sliding surface 348 and the first surface 311-1 faces the cover 343. In one state, in the thin tablet 300, the surfaces 311 are parallel to the xy plane. Note that the thin tablet 300 may move slightly from the state illustrated in FIG. 14 within the accommodation portion 346. In the state illustrated in FIG. 14, a portion in the vicinity of the end on the z2 side of the second protrusion 320-2 and a portion in the vicinity of the end on the y2 side of the second outer edge 313-2 are in contact with the sliding surface 348. The first protrusion 320-1 provided on the first surface 311-1 faces the cover 343. The end on the z1 side of the first protrusion 320-1 is in contact with the cover 343. At the end on the y1 side of the thin tablet 300, the side surface 312 touches the wall 353.

(Use Method)

In FIG. 14, the user peels the cover 343 from the accommodation member 342, and then inserts his/her finger through the inlet 347 to touch at least either the first surface 311-1 or the first protrusion 320-1 of the thin tablet 300. The user then pushes the first surface 311-1, which is positioned on the y1 side of the first protrusion 320-1 (i.e., a portion positioned in a space where the inlet 347 and the sliding surface 348 are relatively distant in the z-direction) toward the z2 side, and thus the y2 side of the thin tablet 300 (i.e., a portion positioned in a space where the inlet 347 and the sliding surface 348 are relatively close in the z-direction) moves in the z1 direction, with the second protrusion 320-2 as a fulcrum. The movement causes the thin tablet 300 to partially approach or move outside from the inlet 347. Next, when the user applies a force in the y2 direction to the thin tablet 300, the thin tablet 300 slides over the sliding surface 348 and the thin tablet 300 moves outside from the inlet 347 or further moves outside from the inlet 347.

According to the present embodiment, the inclination angle of the sliding surface 348 is constant, and thus the thin tablet 100 can be moved smoothly with a constant force.

Fourth Embodiment

Figure 15:
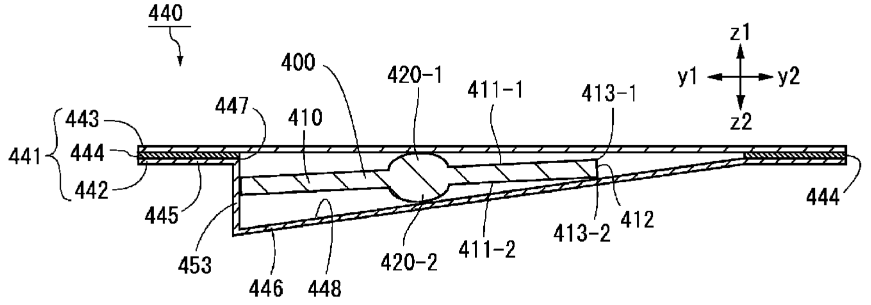
FIG. 15 is a cut-away view of a tablet-containing packaging body of a fourth embodiment.

FIG. 15 is a cut-away view of the tablet-containing packaging body 440 of a fourth embodiment. The cutting plane illustrated in FIG. 15 is obtained at the same position as the cutting surface illustrated in FIG. 14 in the third embodiment. A tablet-containing packaging body 440 of the fourth embodiment has the same shape as the tablet-containing packaging body 340 of the third embodiment, but differs in that the end edge on the y2 side of a sliding surface 448 overlaps with an inlet 447. In other words, the sliding surface 448 continues smoothly from the inlet 447 at the end edge on the y2 side without any step.

According to the present embodiment, when a thin tablet 400 moves along the sliding surface 448 in the y2 direction, the thin tablet 400 smoothly goes out from the inlet 447 without hitting a wall 453. Therefore, the thin tablet 400 is less likely to break when taken out. Also, in other examples where no second protrusion 420-2 is provided, the thin tablet 400 is easily moved outside from the inlet 447.

Fifth Embodiment

Figure 16:
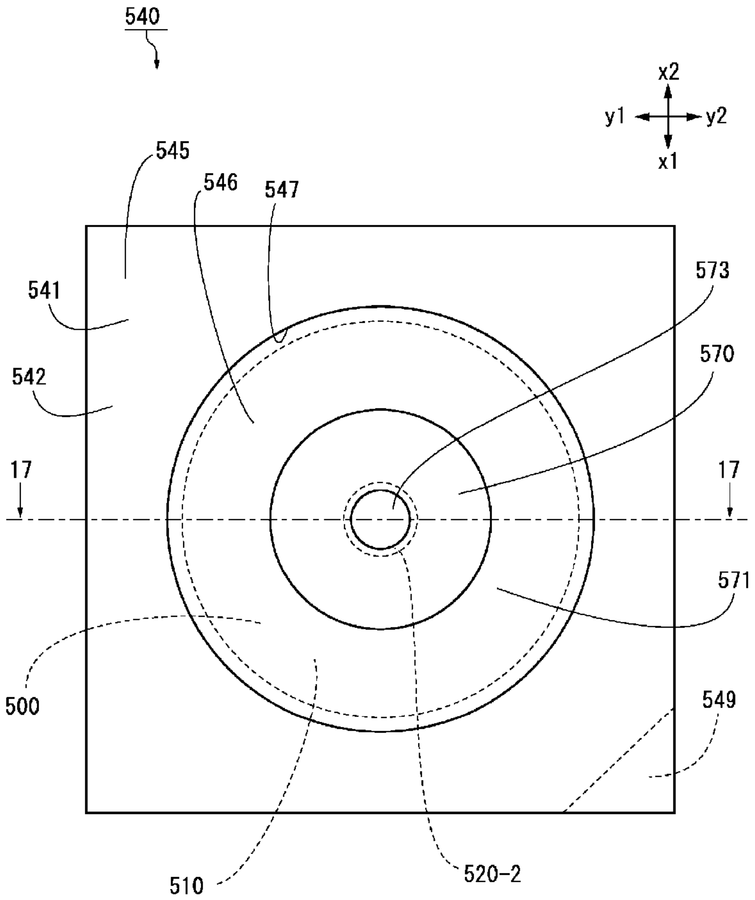
FIG. 16 is a bottom view of a tablet-containing packaging body of a fifth embodiment.
Figure 17:
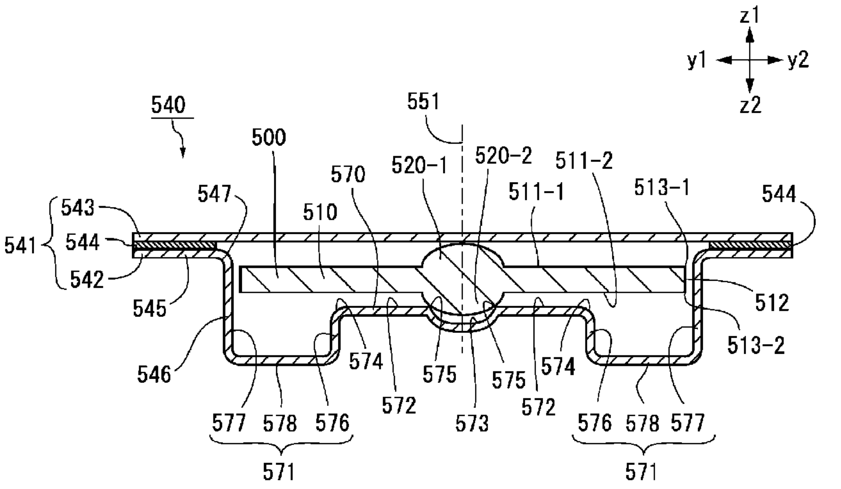
FIG. 17 is a cut-away view of the tablet-containing packaging body taken along line 17-17 of FIG. 16.

FIG. 16 is a bottom view of a tablet-containing packaging body 540 of a fifth embodiment. FIG. 17 is a cut-away view (portions other than the cross section are not illustrated) of the tablet-containing packaging body 540 taken along line 17-17 illustrated in FIG. 16. The tablet-containing packaging body 540 includes a thin tablet 500 and a packaging body 541 that packages the thin tablet 500. The thin tablet 500 of the present embodiment has the same shape as the thin tablet 100 of the first embodiment.

(Packaging Body)

Figure 18:
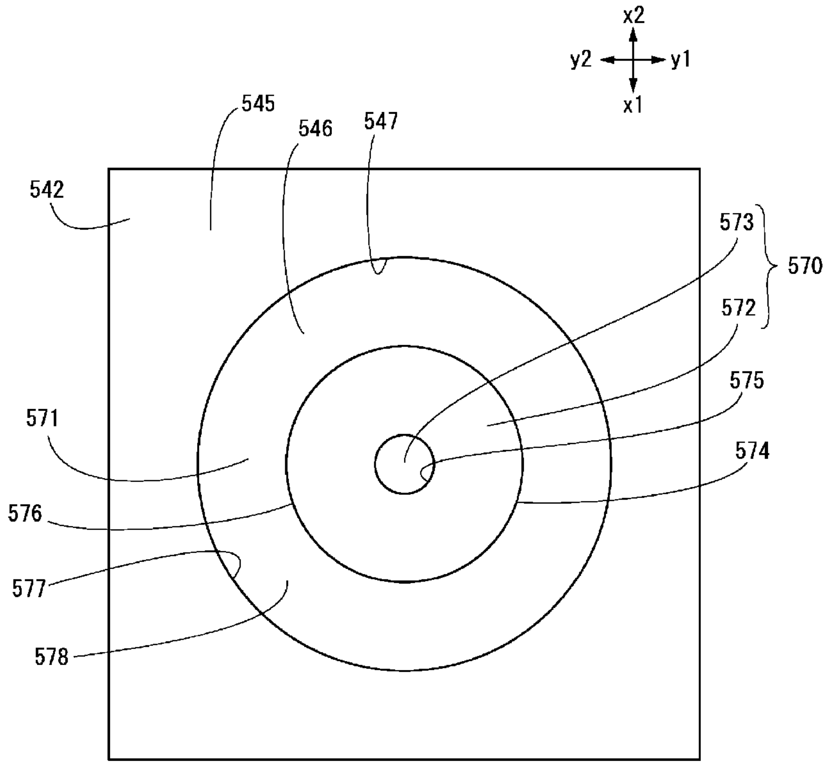
FIG. 18 is a plan view of an accommodation member illustrated in FIG. 16.

As illustrated in FIG. 17, the packaging body 541 includes an accommodation member 542, a cover 543, and an adhesive layer 544. FIG. 18 is a plan view of the accommodation member 542 (i.e., a view illustrating the z2 side when viewed from the z1 side).

The accommodation member 542 is formed by processing a thin sheet material, as illustrated in FIG. 17. The accommodation member 542 includes a margin 545 that extends parallel to the xy plane, and an accommodation portion 546 recessed in the z2 direction from the margin 545. The accommodation member 542 includes an inlet 547 defining a boundary between the margin 545 and the accommodation portion 546 at the outer edge. The inlet 547 is open in the z1 direction. The accommodation portion 546 is recessed from the inlet 547 in the z2 direction. As illustrated in FIG. 18, the inlet 547 is circular. The margin 545 extends from the inlet 547 outside the accommodation portion 546.

As illustrated in FIG. 17, the accommodation portion 546 includes a loading table 570 suitable for loading the thin tablet 500 and a groove 571 recessed toward a direction away from the inlet 547, within the accommodation portion 546.

The loading table 570 includes an opposing surface 572 facing the inlet 547 and a receiving hole 573 recessed from the opposing surface 572. The opposing surface 572 is parallel to the xy plane, faces in the z1 direction (FIG. 17), and extends between a circular outer edge 574 and a circular inner edge 575 (FIG. 18). As illustrated in FIG. 17, the opposing surface 572 is spaced apart from the inlet 547 in the z2 direction. The receiving hole 573 is recessed from the inner edge 575 of the opposing surface 572 in the z2 direction, i.e., in the direction away from the inlet 147.

The diameter of the inner edge 575 of the opposing surface 572 parallel to the xy plane is smaller than the maximum diameter of a second protrusion 520-2 parallel to the xy plane (i.e., the diameter of a boundary with the second surface 511-2). With a portion of the second protrusion 520-2 in the receiving hole 573, the inner edge 575 of the opposing surface 572 is brought into contact with the second protrusion 520-2, and the inner surface of the receiving hole 573 is spaced apart from the second protrusion 520-2.

As illustrated in FIG. 17, the groove 571 includes an inner wall 576, an outer wall 577, and a bottom wall 578. The inner wall 576 has a cylindrical shape extending in the z2 direction from the outer edge 574 of the opposing surface 572. The outer wall 577 has a cylindrical shape extending in z2 direction from an outer edge of the inlet 147. The bottom wall 578 extends parallel to the xy plane between the end on the z2 side of the inner wall 576 and the end on the z2 side of the outer wall 577. As illustrated in FIG. 18, the groove 571 is recessed from the entirety of the outer edge 574 of the opposing surface 572.

As illustrated in FIG. 17, the inlet 547 extends parallel to an imaginary plane (i.e., a plane parallel to the xy plane). The inner surfaces of the opposing surface 572 and the bottom wall 578 do not overlap with any other portions of the accommodation portion 546 in the z-direction orthogonal to the xy plane. That is, when looking in the z2 direction from the z1 direction in a state in which the cover 543 is absent, the entireties of the inner surfaces of the opposing surface 572 and the bottom wall 578 are visible from the inlet 547. The loading table 570 and the groove 571 are rotationally symmetric about an imaginary central axis 551 orthogonal to the xy plane. The imaginary central axis 551 passes through the centers of the inlet 547, the inner edge 575 of the opposing surface 572, and the outer edge 574 of the opposing surface 572.

The cover 543 is formed of a single continuous sheet material parallel to the xy plane and is positioned on the z1 side of the accommodation member 542. The cover 543 generally covers the entirety of the inlet 547 without slack and covers the margin 545. The adhesive layer 544 extending parallel to the xy plane is sandwiched between the cover 543 and the margin 545 in the z-direction. The adhesive layer 544 releasably adheres the cover 543 to the margin 545. The cover 543 includes a handle 549 on a portion of the outer edge. There is no adhesive layer 544 between the handle 549 and the margin 545.

(Loading State)

A loading state in which the thin tablet 500 is loaded on the loading table 570 as illustrated in FIG. 17 will be described. A first surface 511-1 faces the cover 543. The second surface 511-2 faces the loading table 570. In one state, in the thin tablet 500, the surfaces 511 are parallel to the xy plane. A portion of the second protrusion 520-2 is received in the receiving hole 573 to restrict movement in the x-direction and the y-direction.

The second surface 511-2 is spaced apart from the opposing surface 572 in the z-direction. A portion of the thin tablet 500 is positioned between the inlet 547 and the groove 571. Specifically, a constant range of the body 510 of the thin tablet 500 close to an outer edge 513 is positioned between the inlet 547 and the groove 571 in the z-direction. The protrusion 520 provided on the first surface 511-1 faces the cover 543 and is further in contact with the cover 543. Note that the thin tablet 500 may move slightly from the state illustrated in FIG. 17 within the accommodation portion 546.

(Use Method)

Figure 19:
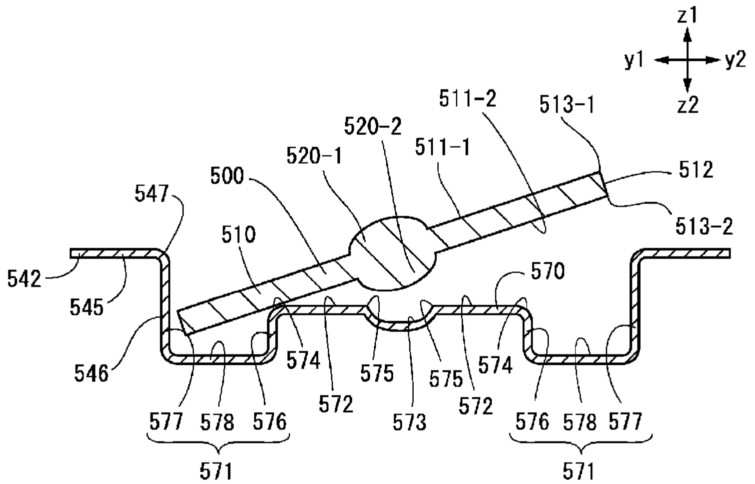
FIG. 19 is a cut-away view of the accommodation member illustrated in FIG. 16 and a moved thin tablet.

FIG. 19 is a cut-away view of the accommodation member 542 and the moved thin tablet 500 in the same cross section as in FIG. 17. FIG. 19 differs from FIG. 17 in that the thin tablet 500 is partially outside from the inlet 547.

As illustrated in FIG. 17, first, the user holds the tablet-containing packaging body 540 generally with the cover 543 up and the accommodation member 542 down. The user then peels the cover 543 from the accommodation member 542 with the handle 549 (FIG. 16) to expose the thin tablet 500 to the outside. The user then inserts his/her finger through the inlet 547 to push the outer edge 513 or a portion close to the outer edge 513 of the first surface 511-1 of the thin tablet 500 in the z2 direction.

As a result, as illustrated in FIG. 19, the thin tablet 500 partially moves outside from the inlet 547, with a portion in the vicinity of the outer edge 574 of the opposing surface 572, that is, a boundary between the opposing surface 572 and the inner wall 576 of the groove 571 as a fulcrum. The user then pinches the first surface 511-1 and the second surface 511-2 to completely take out the thin tablet 500. In this manner, the accommodation member 542 has a structure in which at least a portion of the thin tablet 500 accommodated in the accommodation portion 546 moves toward the inlet 547 upon application of a force by the finger as an object inserted from the inlet 547 to a portion of the thin tablet 500 accommodated in the accommodation portion 546. More specifically, upon application of the force, an other portion of the thin tablet 500 accommodated in the accommodation portion 546 protrudes from the inlet 547.

(Manufacturing Method)

Figure 20:
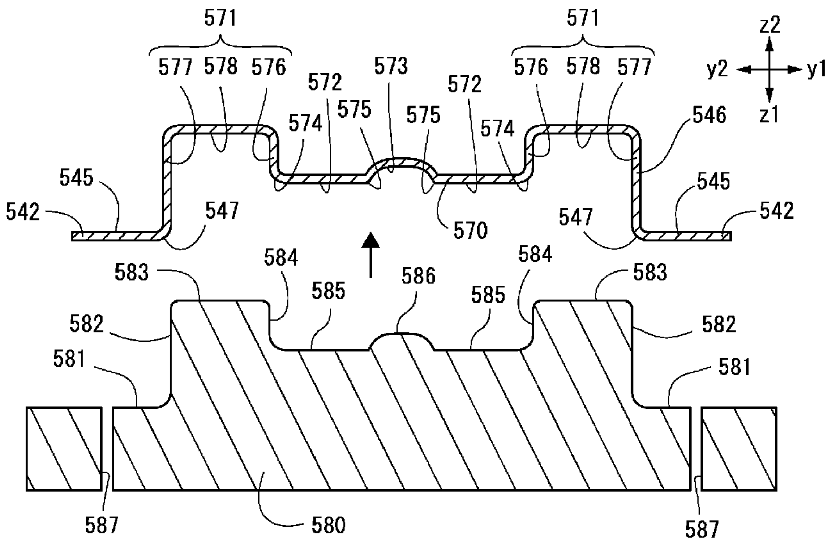
FIG. 20 is a cut-away view of an apparatus for manufacturing the accommodation member illustrated in FIG. 16 and the accommodation member after molding.

FIG. 20 is a cut-away view (portions other than the cross section are not illustrated) of a mold 580 for producing the accommodation member 542 of the tablet-containing packaging body 540 of the present embodiment and the accommodation member 542 after molding. The tablet-containing packaging body 540 of the present embodiment is manufactured by the same manufacturing apparatus and manufacturing method as in the first embodiment, but differs in the mold 580 used.

The mold 580 includes a planar first molding surface 581 for molding the margin 545, which is parallel to the xy plane. The mold 580 includes a second molding surface 582 similar to a cylindrical side surface extending orthogonally from first molding surface 581 in the z-direction. The second molding surface 582 molds the outer wall 577 of the groove 571. The mold 580 includes a donut-shaped third molding surface 583 extending inwardly from the end on the z2 side of the second molding surface 582. The third molding surface 583 is a plane parallel to the xy plane, and faces in the z2 direction. The third molding surface 583 molds the bottom wall 578 of the groove 571.

The mold 580 includes a fourth molding surface 584 similar to the inner wall of the cylinder extending in the z1 direction from an inner edge of the third molding surface 583. The fourth molding surface 584 molds the inner wall 576 of the groove 571. The mold 580 includes a donut-shaped fifth molding surface 585 extending inwardly from the end on the z1 side of the fourth molding surface 584. The fifth molding surface 585 is a plane parallel to the xy plane, and faces in the z2 direction. The fifth molding surface 585 molds the opposing surface 572 of the loading table 570. The mold 580 includes a sixth molding surface 586 protruding in the z2 direction from an inner edge of the fifth molding surface 585. The sixth molding surface 586 molds the receiving hole 573 of the loading table 570.

The shapes of the first molding surface 581 to the sixth molding surface 586 generally conform to the shapes of the surface of the margin 145, the groove 571, and the loading table 570, except that they are opposite in concave/convex shape. Note that a mold, which is opposite in concave/convex shape to the mold 580, may be used. The mold 580 is provided with a plurality of suction holes 587 in at least one of the first molding surface 581 to the sixth molding surface 586. The suction holes 587 may be provided elsewhere.

Modified Examples

In other examples, the groove 571 is recessed from at least a portion of the outer edge 574 of the opposing surface 572.

(Summary 1)

According to the present embodiment, the thin tablet 500 is easily taken out of the packaging body 541 because at least a portion of the thin tablet 500 moves toward the inlet 547 upon application of a force to a portion of the thin tablet 500 with an object such as a finger.

According to the present embodiment, the thin tablet 500 is easily taken out of the packaging body 541 because an other portion of the thin tablet 500 protrudes from the inlet 547 upon application of the force to the portion of the thin tablet 500 with the object such as a finger.

According to the present embodiment, the accommodation portion 546 includes the loading table 570 suitable for loading the thin tablet 500 and the groove 571 recessed toward a direction away from the inlet 547, within the accommodation portion 546. Further, the loading table 570 includes the opposing surface 572 facing the inlet 547, and the groove 571 is recessed from at least a portion of the outer edge 513 of the opposing surface 572. So, the thin tablet 500 is tilted at the boundary between the opposing surface 572 of the loading table 570 and the groove 571, and thus an other portion of the thin tablet 500 can be easily protruded from the inlet 547.

According to the present embodiment, the groove 571 is recessed from the entirety of the outer edge 513 of the opposing surface 572, so the thin tablet 500 can be tilted at various positions on the boundary between the opposing surface 572 and the groove 571.

According to the present embodiment, the cover 543 that at least partially covers the inlet 547 makes it possible to accommodate the thin tablet 500 stably in the accommodation portion 546.

According to the present embodiment, because the packaging body 541 includes the adhesive layer 544 that releasably adheres the cover 543 to the margin 545, it is not necessary to tear open the cover 543, making it difficult to break the thin tablet 500.

According to the present embodiment, a portion of the thin tablet 500 is positioned between the inlet 547 and the groove 571. So, the thin tablet 500 is easy to tilt at the boundary between the opposing surface 572 of the loading table 570 and the groove 571, and an other portion of the thin tablet 500 can be easily protruded from the inlet 547. Further, because the protrusion 520 faces the cover 543 in the loading state, rocking of the thin tablet 500 can be restricted without thickening the body 510, making it difficult to damage the thin tablet 500.

According to the present embodiment, the protrusion 520 is received in the receiving hole 573, thereby making it possible to restrict rocking of the thin tablet 500.

Sixth Embodiment

Figure 21:
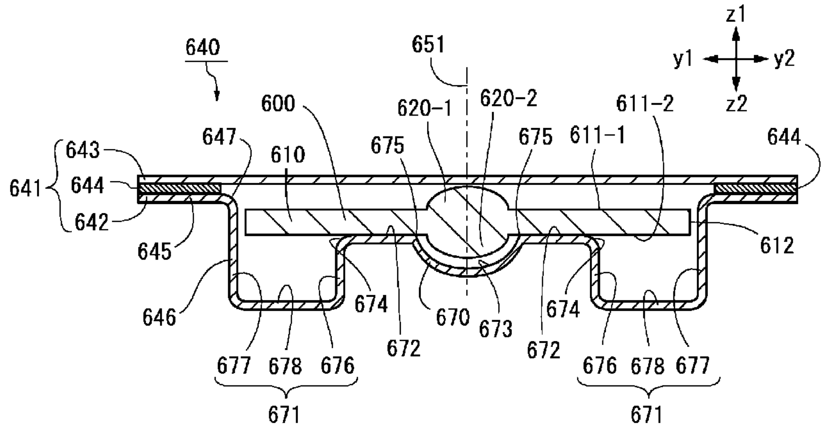
FIG. 21 is a cut-away view of the tablet-containing packaging body of a sixth embodiment.

FIG. 21 is a cut-away view of the tablet-containing packaging body 640 of a sixth embodiment. The cutting plane illustrated in FIG. 21 is obtained at the same position as the cutting surface illustrated in FIG. 17 in the fifth embodiment. The tablet-containing packaging body 640 of the sixth embodiment has the same shape as the tablet-containing packaging body 540 of the fifth embodiment, but differs in that a second surface 611-2 of a thin tablet 600 is in contact with an opposing surface 672 of a loading table 670.

The diameter of the inner edge 675 of the opposing surface 672 parallel to the xy plane is larger than the maximum diameter of a second protrusion 620-2 parallel to the xy plane (i.e., the diameter of a boundary with the second surface 611-2). With the entirety of the second protrusion 620-2 in a receiving hole 673, the opposing surface 672 is brought into contact with the second surface 611-2, and the entirety of the inner surface of the receiving hole 673 is spaced apart from the second protrusion 620-2. The inner surface of the receiving hole 673 may be brought into contact with the second protrusion 620-2.

According to the present embodiment, the thin tablet 600 is stable due to contact between the planar opposing surface 672 and the planar second surface 611-2.

The above embodiments and modified examples can be combined as long as the technical ideas disclosed herein are realized.

REFERENCE SIGNS LIST

100 . . . Thin tablet
101 . . . Manufacturing apparatus
102 . . . Molding device
110 . . . Body
111 . . . Surface
112 . . . Side surface
113 . . . Outer edge
120 . . . Protrusion
130 . . . External plane
135 . . . Gap
140 . . . Tablet-containing packaging body
141 . . . Packaging body
142 . . . Accommodation member
143 . . . Cover
144 . . . Adhesive layer
145 . . . Margin
146 . . . Accommodation portion
147 . . . Inlet
148 . . . Sliding surface
149 . . . Handle
164 . . . Mold
167 . . . Suction hole
168 . . . Sheet material
170 . . . Material
252 . . . Barb
353 . . . Wall
570 . . . Loading table
571 . . . Groove
572 . . . Opposing surface
573 . . . Receiving hole
574 . . . Outer edge

575 . . . Inner edge
576 . . . Inner wall
577 . . . Outer wall
578 . . . Bottom wall
580 . . . Mold

The invention claimed is:

1. A tablet-containing packaging body comprising:

a packaging body comprising an accommodation member;

a thin tablet accommodated in the packaging body, and a cover, wherein the accommodation member comprises:

an inlet that is at least partially covered by the cover; and an accommodation portion recessed from the inlet, the accommodation member has a structure in which at least a portion of the thin tablet accommodated in the accommodation portion moves toward the inlet upon application of a force, by an object inserted from the inlet, to a portion of the thin tablet accommodated in the accommodation portion, and another portion of the thin tablet accommodated in the accommodation portion protrudes from the inlet upon application of the force, wherein the thin tablet comprises:

a tablet body having a thickness of 0.5 mm or more and 1.5 mm or less and two surfaces that are planes, and at least one protrusion provided on at least one of the surfaces;

wherein the accommodation portion includes, within the accommodation portion:

a loading table suitable for loading the thin tablet;

a groove recessed toward a direction away from the inlet, the loading table includes an opposing surface that faces the inlet, and the groove is recessed from at least a portion of an outer edge of the opposing surface; and wherein the two surfaces include a first surface and a second surface, one protrusion of the at least one protrusion is provided on the first surface, the first surface faces the cover in a loading state in which the thin tablet is loaded on the loading table, the second surface faces the loading table in the loading state, a portion of the thin tablet is positioned between the inlet and the groove in the loading state, and the protrusion provided on the first surface faces the cover in the loading state.

2. The tablet-containing packaging body according to claim 1, wherein the accommodation member includes a margin extending from the inlet outside the accommodation portion, and the packaging body includes an adhesive layer that releasably adheres the cover to the margin.

3. The tablet-containing packaging body according to claim 1, wherein the groove is recessed from an entirety of the outer edge of the opposing surface.

4. The tablet-containing packaging body according to claim 1, wherein the accommodation member includes a margin extending from the inlet outside the accommodation portion, and the packaging body includes an adhesive layer that releasably adheres the cover to the margin.

5. The tablet-containing packaging body according to claim 1, wherein a portion of the thin tablet is positioned between the inlet and the groove.

6. The tablet-containing packaging body according to claim 1, wherein another protrusion of the at least one protrusion is provided on the second surface, the loading table includes a receiving hole recessed from the opposing surface, the receiving hole is recessed toward a direction away from the inlet, and in the loading state, at least a portion of the protrusion provided on the second surface is received in the receiving hole.

* * * * *